United States Patent Office 3,070,112
Patented Dec. 25, 1962

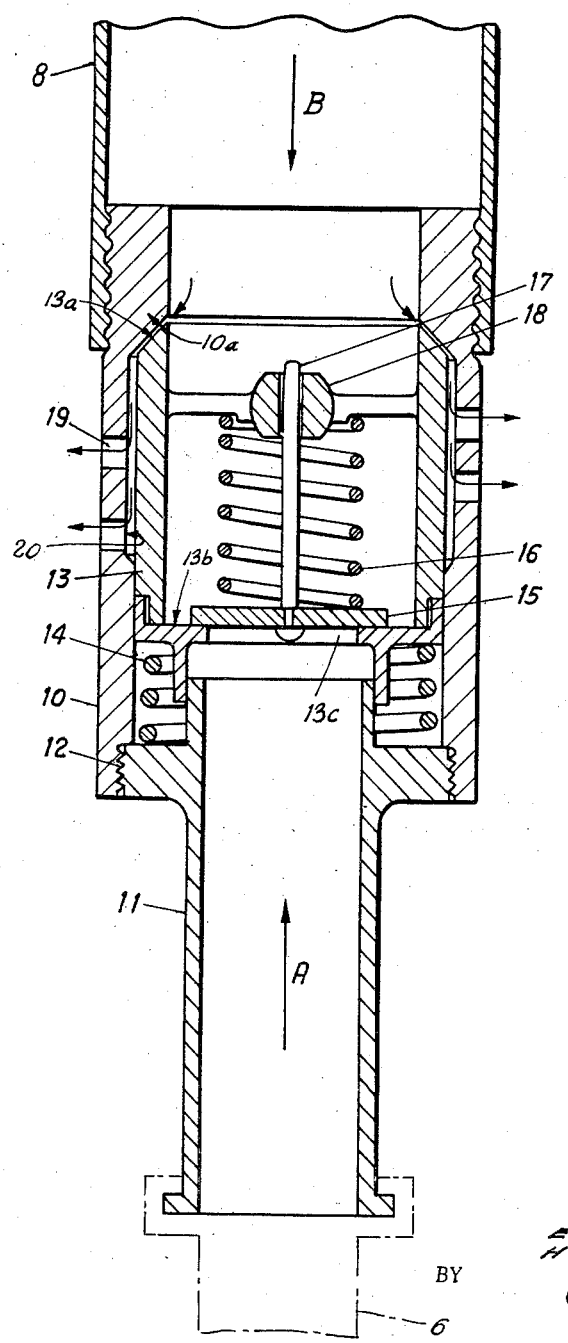

3,070,112
AUTOMATIC CONTROL VALVE FOR USE IN CONNECTION WITH THE RAISING OF SUNKEN BODIES
Erwin Fricke and Herbert Damm, Hamburg, Germany, assignors to Anton Lohrer, Wil St. Gallen, Switzerland
Filed Nov. 3, 1958, Ser. No. 771,367
2 Claims. (Cl. 137—102)

The present invention relates to sunken objects, particularly ships, aircraft and the like and more particularly concerns a device for use in connection with such operations.

It is a first object of this invention to provide means for raising sunken objects which heretofore were beyond recovery on account of their large weight.

It is a further object of this invention to permit the salvaging operations to be interrupted, i.e. performed in successive stages, as, for instance, owing to bad weather conditions, such stage-by-stage procedure having no adverse effect on the previously performed operations.

It is a still further object of this invention to provide a salvaging device for use in connection with the above mentioned salvaging operation, which may be reused so that it will have to be purchased only once.

It is a still further object of this invention to permit the use of relatively simple gear for the raising even of very heavy and cumbersome sunken objects, and to permit the salvaging of wrecks from such depths which heretofore made such operations practically unfeasible before now.

Finally, it is a still further object of this invention to permit control over the position of the wreck being raised, and so to prevent a sunken ship, for instance, from being refloated keel upwards.

These and other objects of the invention will become more apparent from the following description taken in connection with the accompanying drawing showing a section through a pressure control valve according to the present invention for use in connection with the raising of sunken objects.

To prevent a sunken body to be raised, for instance a wreck, from shooting to the surface when the buoyancy is built up sufficiently, provision is made for at least one pressure-control valve, whose air outlet opens in accordance with the water pressure acting upon said valve. During the rise of the wreck, the bodies would expand still further owing to the decreasing water pressure, thus producing a still greater buoyancy and finally resulting in the wreck shooting to the surface and possibly causing the buoyancy bodies to explode.

The pressure-control valve according to the invention is preferably combined with the inlet for the compressed air of the buoyancy bodies used in connection with the raising of sunken objects and is so designed that it can be connected to the compressed-air line in the easiest manner possible, as, for instance, by a turning movement in conjunction with a bayonet lock.

It is conceivable to inflate one buoyancy body after the other, while the inlet valve for the compressed-air supply may be so arranged that it can be operated either by the diver under water or from the salvage vessel according to the diver's instructions. It would also be possible, that the diver has a container with him, containing compressed air or an other gas for filling the buoyancy bodies.

For every 10 metres of depth, approximately 1 kg./cm.$^2$ of pressure is required. Thus, if the wreck to be raised lies at a depth of 40 metres, for instance, the pneumatic system aboard the salvage vessel must develop a pressure of about 5 kg./cm.$^2$ to permit the inflation of the plastic bags.

To prevent a further expansion of the buoyancy bodies owing to the water pressure decreasing when the wreck rises, the pressure-reducing valve according to the invention is so adjusted that, with decreasing water pressure, its outlet is opened far enough to let part of the injected air escape and keep the volume of the buoyancy bodies nearly constant throughout the rise. To ensure a gentle rise of the wreck, the dimension of the outlet should be relatively large, as it might be necessary to discharge a considerable part of the injected air in a short time depending on the depth at which the sunken objects lie.

It is, of course, feasible that the buoyancy bodies consist of a seawater-resistant plastic material or material other than plastic, and that instead of air other gaseous medium is pumped into the buoyancy bodies. Also, it is conceivable that several buoyancy bodies are connected to a common pressure-discharge valve instead of each buoyancy body having a separate valve.

The pressure-reducing valve according to the invention consists of a tubular sleeve composed of the tubular parts 10 and 11, the connection between the two being made by means of a threaded portion 12. The one end of the tube—i.e. the upper one in the drawing—is inserted into the matching neck of the buoyancy body 8, and the other end of the tube—i.e. the lower one in the drawing—is connected to a compressed-air hose 6 in a suitable manner. Slidably fitted inside the sleeve 10 is a bushing 13 adapted with its chamfered face 13a to rest against a matched jutting portion 10a of the sleeve 10. Arranged between the tubular part 11 and the other face of the bushing 13 is a compression spring 14 which urges the bushing 13 against the jutting portion of the sleeve 10 into sealing engagement therewith. The bushing 13 is provided in its axial bore with a valve flap 15, which is urged by the compression spring 16 to close the passage way 13c. Connected to the valve flap 15 is a pin 17 which is slidably held in a guide member 18 of the bushing 13. Sleeve 10 is provided with bores 19 opening into an annular depression 20 on the inside of sleeve 10, said depression confining with the outside of bushing 13 an annular chamber.

The operation of the pressure-reducing valve is as follows. When compressed air is injected from the compressed-air line 6 in the direction of the arrow A through pipe 11, the injected air lifts valve flap 15 against the thrust of spring 16 so that compressed air is admitted into buoyancy body 8 and inflates the latter. When subsequently, the compressed air hose 6 is disconnected from pipe 11, the compressed air injected into the buoyancy body forces the valve flap 15 back against its rest 13b mounted on the bushing 13 and so effects a tight seal preventing any backflow of air. Now when the wreck begins to rise, and with it the pressure-reducing valve, the water pressure acting upon the face of the bushing 13 in the direction of the arrow A will decrease. As a result, the pressure prevailing inside the buoyancy body 8 moves the bushing 13 in axial direction against the thrust of spring 14, as indicated by the arrow B. This action produces a gap between the chamfered face 10a of the bushing 13 and the jutting portion 13a of the sleeve 10, thus permitting air to escape through the space 20 and out of the bores 19. This action continues until the balance is established between the internal pressure of the buoyancy body and the prevailing water pressure acting upon the pressure-reducing valve. The springs 14 and 16 are so set that the amount of air discharged is just sufficient to keep the volume of the buoyancy bodies constant or at least nearly constant.

It is also possible to adopt a design wherein the pressure-reducing valve acts independently of the inlet valve and wherein the latter is located separately from the pressure-reducing valve.

Various changes and modifications may be made without departing from the spirit and scope of the present invention and it is intended that such obvious changes and modifications be embraced by the annexed claims.

Having now described the invention, what is claimed as new and desired to be secured by Letters Patent is:

1. In an automatic control valve for use in connection with the raising of sunken bodies, especially ships: a housing having a first opening for connection with a compressed air supply source and also having a second opening for connection with a buoyancy body to be inflated, said housing having an axial bore therethrough with a conical valve seat formed in the wall defining said bore immediately adjacent said second opening, a first valve member reciprocably mounted in said bore and defining therewith annular passage means communicating with the outside of said housing and adapted to communicate with said second opening via said valve seat, said first valve member being provided with a conical valve surface adapted to move into a first position for sealingly engaging said valve seat to thereby prevent communication between said passage means and said second opening and also adapted to move away from said first position toward a second position for disengaging said valve seat to thereby establish communication between said second opening and said passage means, said first valve member also comprising a bore communicating with said first opening, a second valve member in said first valve member normally closing said last mentioned bore but adapted in response to a certain pressure at said first opening to open said last mentioned bore to thereby establish communication between said first opening and said second opening, first relatively weak spring means continuously urging said second valve member into position for closing said last mentioned bore, and second relatively strong spring means for continuously urging said first valve member toward the said first position of said first valve member.

2. In an automatic control valve for use in connection with the raising of sunken bodies, especially ships: a housing having an axial bore therethrough, a first connecting member connected to one end of said housing for connection with a compressed air supply source, said first connecting member having a bore therethrough for communication with the axial bore in said housing, a second connecting member connected to the other end of said housing and having a bore therethrough for establishing communication between said axial bore and a body to be inflated, an annular depression provided on the inner wall of said housing and communicating with the outside of said housing and adapted to communicate with the bore in said second connecting member, said depression including a conical surface forming a valve seat at the end of the depression which is adjacent said bore in said second member, a first valve member reciprocably mounted in said axial bore and defining with said depression an annular chamber adapted to communicate with the bore in said second connecting member via said valve seat, said first valve member being provided with a conical surface corresponding to said valve seat and adapted to move into a first position for sealingly engaging said valve seat to thereby prevent communication between said depression and said bore in said second connecting member and also adapted to move into a second position to thereby establish communication between said annular chamber and the bore in said second connecting member, relatively strong spring means continuously urging said first valve member into its closing position, said first valve member comprising passage means for establishing communication between the bore in said first connecting member and the bore in said second connecting member, a second valve member in said first valve member movable into a first position for closing said passage means to interrupt communication between the bore in said first connecting member and the bore in said second connecting member, said second valve member also being movable in response to pressure in the bore of said first connecting member into a second position for opening said passage means to thereby establish communication between the bore in said first connecting member and the bore in said second connecting member, and relatively weak spring means continuously urging said second valve member into its first position.

References Cited in the file of this patent

UNITED STATES PATENTS

| | | |
|---|---|---|
| 1,228,914 | Hayford | June 5, 1917 |
| 1,462,824 | Reed et al. | July 24, 1923 |
| 1,486,131 | Dutton | Mar. 11, 1924 |
| 1,682,848 | Moody et al. | Sept. 4, 1928 |
| 1,848,581 | Stein | Mar. 8, 1932 |
| 1,863,732 | Schwager | June 21, 1932 |
| 2,076,918 | Robison | Apr. 13, 1937 |
| 2,213,375 | Barna | Sept. 3, 1940 |
| 2,252,418 | Shelley | Aug. 12, 1941 |
| 2,270,549 | Orr | Jan. 20, 1942 |
| 2,346,974 | Kyne | Apr. 18, 1944 |
| 2,610,859 | Wilcox et al. | Sept. 16, 1952 |
| 2,711,868 | Parker et al. | June 28, 1955 |
| 2,966,917 | Bloom | Jan. 3, 1961 |

FOREIGN PATENTS

| | | |
|---|---|---|
| 2,423 | Great Britain | 1890 |